(12) United States Patent
Nasli Bakir et al.

(10) Patent No.: US 11,981,838 B2
(45) Date of Patent: May 14, 2024

(54) ADHESIVE FORMULATION COMPRISING LIGNIN

(71) Applicant: Stora Enso OYJ, Helsinki (FI)

(72) Inventors: Ben Nasli Bakir, Saltsjö-Boo (SE); Ashar Zafar, Älta (SE); Jesper Ekström, Johanneshov (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 17/048,715

(22) PCT Filed: Apr. 16, 2019

(86) PCT No.: PCT/IB2019/053100
§ 371 (c)(1),
(2) Date: Oct. 19, 2020

(87) PCT Pub. No.: WO2019/202478
PCT Pub. Date: Oct. 24, 2019

(65) Prior Publication Data
US 2021/0238464 A1    Aug. 5, 2021

(30) Foreign Application Priority Data
Apr. 20, 2018  (SE) .................................. 1850470-4

(51) Int. Cl.
C09J 197/00    (2006.01)
C08H 7/00      (2011.01)
C08L 97/02     (2006.01)
C09J 161/06    (2006.01)

(52) U.S. Cl.
CPC ............ *C09J 197/005* (2013.01); *C08H 6/00* (2013.01); *C08L 97/02* (2013.01); *C09J 161/06* (2013.01)

(58) Field of Classification Search
CPC ............................ C09J 197/005; C09J 161/06
See application file for complete search history.

(56) References Cited

U.S. PATENT DOCUMENTS

| | | | |
|---|---|---|---|
| 3,931,070 A | 1/1976 | Bond et al. | |
| 4,113,542 A | 9/1978 | Johansson | |
| 4,433,120 A * | 2/1984 | Chiu ...................... | C08L 61/06 427/393 |
| 4,824,896 A * | 4/1989 | Clarke ................... | C09J 161/04 524/405 |
| 5,173,527 A * | 12/1992 | Calve .................... | C09J 161/06 524/74 |
| 5,254,639 A | 10/1993 | Gardziella et al. | |
| 11,130,257 B2 * | 9/2021 | Zafar .................... | C09J 197/005 |
| 2013/0292864 A1 * | 11/2013 | Breyer .................. | C09J 175/04 264/40.1 |
| 2015/0159061 A1 * | 6/2015 | Kouisni ................ | C09J 161/14 524/841 |
| 2015/0210904 A1 * | 7/2015 | Cothran ................ | C09J 161/06 428/526 |
| 2016/0304757 A1 | 10/2016 | Feng et al. | |
| 2016/0369033 A1 | 12/2016 | Delmas et al. | |
| 2016/0376434 A1 | 12/2016 | Valkonen et al. | |
| 2017/0275384 A1 | 9/2017 | Capanema et al. | |
| 2019/0048192 A1 * | 2/2019 | Zafar ...................... | C08G 8/34 |
| 2019/0152094 A1 * | 5/2019 | Zafar .................... | C09J 161/06 |
| 2019/0390106 A1 * | 12/2019 | Ramos .................. | C09K 8/203 |
| 2020/0216672 A1 * | 7/2020 | Zafar .................... | C08L 97/005 |
| 2021/0238367 A1 * | 8/2021 | Nasli Bakir .......... | B27N 3/002 |
| 2021/0238464 A1 * | 8/2021 | Nasli Bakir .......... | C08H 6/00 |
| 2021/0253922 A1 * | 8/2021 | Nasli Bakir .......... | B27N 3/04 |

FOREIGN PATENT DOCUMENTS

| | | |
|---|---|---|
| CN | 101348698 A | 1/2009 |
| CN | 101492522 A | 7/2009 |
| CN | 104004479 A | 8/2014 |
| CN | 104530639 A | 4/2015 |
| CN | 105694781 A | 6/2016 |
| WO | 9218557 | 10/1992 |
| WO | 9321260 | 10/1993 |
| WO | 9424192 | 10/1994 |
| WO | 2006031175 A1 | 3/2006 |
| WO | 2015114211 A1 | 8/2015 |
| WO | 2018047047 A1 | 3/2018 |

OTHER PUBLICATIONS

Campbell et al. (J. Adhesion 1985, vol. 18, 301-314) (Year: 1985).*
Revised version of International Search Report for PCT/IB2019/053100, dated Oct. 25, 2019.

* cited by examiner

Primary Examiner — Liam J Heincer
(74) Attorney, Agent, or Firm — Greer, Burns & Crain, Ltd.

(57) ABSTRACT

The present invention relates to an adhesive formulation comprising lignin, suitable for use in the manufacture of for example wood products. The lignin is provided in the form of a solution or dispersion or in dry solid form, such as in the form of a powder. The adhesive formulation also comprises phenol-formaldehyde (PF) resin and/or lignin-phenol-formaldehyde (LPF) resin. The adhesive formulation may also comprise extenders, hardeners, fillers and other additives, to achieve an adhesive formulation useful in the manufacture of for example wood products, such as plywood and laminated veneer lumber (LVL). The adhesive formulation can also be used in the manufacture of laminates and oriented strand boards.

12 Claims, No Drawings

ADHESIVE FORMULATION COMPRISING LIGNIN

This application is a U.S. National Phase under 35 U.S.C. § 371 of International Application No. PCT/IB2019/053100 filed Apr. 16, 2019, which claims priority under 35 U.S.C. §§ 119 and 365 to Swedish Application No. 1850470-4, filed Apr. 20, 2018.

FIELD OF THE INVENTION

The present invention is directed to an adhesive formulation comprising lignin, suitable for use in the manufacture of for example wood products. The lignin is provided in the form of a solution or dispersion or in dry solid form, such as in the form of a powder. The adhesive formulation also comprises phenol-formaldehyde (PF) resin and/or lignin-phenol-formaldehyde (LPF) resin. The adhesive formulation may also comprise extenders, hardeners, fillers and other additives, to achieve an adhesive formulation useful in the manufacture of for example wood products, such as plywood and laminated veneer lumber (LVL). The adhesive formulation can also be used in the manufacture of laminates and oriented strand boards.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of structural wood products such as plywood, oriented strand board and fiberboard. During synthesis of such adhesives, phenol, which may be partially replaced by lignin, is reacted with formaldehyde in the presence of either basic or acidic catalyst to form a highly cross-linked aromatic resins termed novolacs (when utilizing acidic catalysts) or resoles (when utilizing basic catalysts). Currently, only limited amounts of the phenol can be replaced by lignin due to the lower reactivity of lignin.

When manufacturing wood products such as plywood and LVL, an adhesive formulation is formulated by adding fillers and extenders to phenolic resin to provide holdout on the surface, control the rheology for the specific application method and make the adhesive cheaper. The adhesive formulation is typically formulated by mixing phenolic resin, hardener, filler and/or water in a certain ratio.

One problem when preparing an adhesive formulation is to ensure that adequate properties are achieved, particularly the mechanical performance of the wood product manufactured using the adhesive formulation. At the same time, it is desirable to use as much renewable material as possible in the adhesive formulation and at the same time minimize the use of for example phenol and/or formaldehyde.

SUMMARY OF THE INVENTION

It has now surprisingly been found that it is possible to prepare an adhesive formulation having advantageous properties, yet containing a considerable amount of lignin, a renewable material. More specifically, the mechanical properties of products, such as laminated veneer lumber (LVL), manufactured using the adhesive formulation according to the present invention, are comparable to state of the art adhesive formulations, yet replacing a significant part of the non-renewable contents of the adhesive formulation with lignin, a renewable material.

The present invention is thus directed to an adhesive formulation comprising lignin, provided in the form of a solution or dispersion or in dry solid form; phenol-formaldehyde resin and/or lignin-phenol-formaldehyde resin.

The adhesive formulation preferably also comprises additives. The additives may for example be extenders, fillers or hardeners.

The present invention is also directed to a method for preparing an adhesive formulation comprising the steps of
 a) providing at least one resin comprising phenol, formaldehyde and optionally lignin;
 b) providing lignin in the form of a solution or dispersion or in dry solid form;
 c) mixing the at least one resin and the lignin provided in the form of a solution or dispersion or in dry solid form;
 d) optionally adding additives.

The present invention is also directed to the use of the adhesive formulation in the manufacture of a laminate, mineral wool insulation, wood product such as plywood, laminated veneer lumber (LVL), medium density fiberboards (MDF) or particle board.

The invention is also directed to laminate, mineral wool insulation, wood product such as plywood, laminated veneer lumber (LVL), oriented strand boards (OSB), medium density fiberboards (MDF) or particle board manufactured using the adhesive formulation.

For laminates and oriented strand boards, the lignin can be provided to the adhesive formulation in powder or liquid form, i.e. lignin solution or dispersion. Urea and/or other additives can be added to the lignin solution or dispersion to increase the solid content of the lignin solution or dispersion and reduce the viscosity of the lignin solution or dispersion. In some cases, methanol can be added to the lignin solution/dispersion to reduce the viscosity of the lignin solution or dispersion.

DETAILED DESCRIPTION

The adhesive formulation according to the present invention comprises lignin, provided in the form of a solution or dispersion or in dry solid form; phenol-formaldehyde resin and/or lignin-phenol-formaldehyde resin.

The resin comprising phenol, formaldehyde and optionally lignin can be prepared using methods known in the art.

For example, when preparing a lignin-phenol-formaldehyde resin, lignin can be dissolved into an aqueous medium comprising alkali. The dissolution of the lignin may be carried out with or without heating. In a subsequent step, phenol and formaldehyde is added to the solution, separately or simultaneously. The reaction mixture is heated to approximately 40-95° C. until the reaction is completed and desirable properties, such as viscosity, have been achieved. The amount of lignin used in the preparation of the resin is typically such that lignin has replaced phenol to a replacement level of 5-90% in the resin. Thus, the lignin reacts during the preparation of the resin. Lignin may be utilized as a powder at the time that it is incorporated into the resin formulation. Lignin can also be utilized in "liquid form" in an alkali solution or dispersion without alkali in order to avoid lignin dust.

A phenol-formaldehyde resin can also be prepared using methods known in the art. There is essentially no lignin used in the preparation of a phenol-formaldehyde resin. However, for practical purposes, small amounts of lignin may be present since a reaction vessel which has previously been used to prepare a lignin-phenol-formaldehyde resin may be used also in the preparation of the phenol-formaldehyde resin. For example, phenol and formaldehyde may be mixed in an aqueous medium, optionally in the presence of alkali, the phenol and formaldehyde being added separately or simultaneously to the liquid medium. The reaction mixture is heated to approximately 40-95° C. until the reaction is completed and desirable properties, such as viscosity, have been achieved.

The at least one resin and the lignin and the optional additives may be prepared in any order prior to being mixed with each other in any order.

The step of mixing the at least one resin and the lignin can be carried out at room temperature or ambient temperature, such as at a temperature of from 20° C. to 35° C. The mixing can be carried using traditional mixing equipment and the mixing can be carried out batch-wise or continuously. The mixing is preferably carried out such that the stirring is performed at less than 10000 rpm, more preferably in the range of from 10 to 5000 rpm, such as from 10 to 1000 rpm, particular 20 to 500 rpm. The mixing is typically carried out for at least one minute, such as from 1 minute to 2 hours, depending on the volume of the adhesive formulation being prepared.

When preparing the adhesive formulation, the viscosity of the mixture of the at least one resin and the lignin is preferably monitored, either on a continuous basis or by taking samples at defined time intervals.

The amount of each of the components of the adhesive formulation depends on the intended use of the adhesive formulation and the required properties necessary for that use. Typically, the amount of the at least one resin is 40-85% by weight of the adhesive formulation, if lignin is provided in solid dry form. The amount of lignin is then typically 5-45% by weight of the adhesive formulation. The amount of additives is typically 5-30% by weight of the adhesive formulation. The amount of water or solvent in the adhesive formulation is typically 5-30% by weight of the adhesive formulation.

When the lignin is provided as a solution, the lignin solution typically comprises lignin in an amount of 10-45% by weight of the lignin solution. The lignin solution typically also comprises alkali in an amount of 3-15% by weight of the lignin solution. The amount of water in the lignin solution is typically 20-80% by weight of the lignin solution. The lignin solution may also comprise other solvents or additives, such as methanol, ammonia and urea.

When the lignin is provided to the adhesive formulation as a solution, the amount of the at least one resin is 30-90% by weight of the adhesive formulation. The amount of lignin solution is then typically 10-60% by weight of the adhesive formulation. The amount of additives is typically 5-30% by weight of the adhesive formulation. The amount of water or solvent in the adhesive formulation is typically 5-30% by weight of the adhesive formulation.

In one embodiment of the present invention, the adhesive formulation comprises one resin, which is a phenol-formaldehyde resin. In one embodiment of the present invention, the adhesive formulation comprises one resin, which is a lignin-phenol-formaldehyde resin.

In one embodiment of the present invention, the adhesive formulation comprises at least two resins, one of which is a phenol-formaldehyde (PF) resin and one of which is a lignin-phenol-formaldehyde (LPF) resin. In one embodiment, at least 50% by weight of the total amount of resin in the adhesive formulation is LPF resin, preferably at least 70%, more preferably at least 80%.

The adhesive formulation according to the present invention may optionally comprise additives. Examples of additives are urea, methanol, hardeners, fillers and/or extenders. Examples of fillers or extenders are wheat flour, limestone, corn starch or flour of coconut, walnut shell, soya bean and wood. Examples of hardener are sodium carbonate and sodium hydroxide.

The present invention is thus also directed to the use of the adhesive formulation in the manufacture of laminates, mineral wool insulation and wood products such as plywood, laminated veneer lumber (LVL), oriented strand boards (OSB), medium density fiberboards (MDF) and particle boards. The present invention is also directed to such laminates, mineral wool insulation and wood products such as plywood, laminated veneer lumber (LVL), medium density fiberboards (MDF) and particle boards manufactured using the adhesive formulation.

It is intended throughout the present description that the expression "lignin" embraces any kind of lignin, e.g. lignin originated from hardwood, softwood or annular plants. Preferably the lignin is an alkaline lignin generated in e.g. the Kraft process. The lignin may then be separated from the black liquor by using the process disclosed in WO2006031175.

The pH of the mixture of the adhesive formulation may be adjusted by addition of acid or base, depending on the final use of the adhesive formulation. To the extent alkali is added, it is preferably sodium hydroxide, potassium hydroxide, calcium hydroxide, magnesium hydroxide or a mixture thereof. To the extent acid is added, it is preferably sulphuric acid or paratoluenesulphonic acid.

The adhesive formulation according to the present invention is useful for example in the manufacture of products such as laminated veneer lumber (LVL) and plywood. The adhesive formulation is typically applied onto the surface of the veneers by spraying, by ribbon application, liquid extrusion, curtain coating, as a foam or by brushing, before the veneers are pressed together at elevated temperature.

EXAMPLES

Example 1

Reference phenol formaldehyde (PF) resin for plywood was prepared in a 5 L glass reactor and mixed with pitched blade stirrer. Firstly, 1116 g of molten phenol, 576 g of water and 461 g of NaOH solution (50%) were added to the glass reactor and mixed.

Secondly, 2048 g of 40% formaldehyde solution was added slowly to prevent excessive heat development. The temperature was kept constant at 60° C. for 30 minutes and was then increased to 80° C. When the viscosity had increased to approximately 200-250 mPas, the temperature was set to 75° C. and 155 g of NaOH solution (50%) was added. When the target viscosity of 220-250 mPas was obtained, the reaction was stopped by cooling to ambient temperature. The reaction was monitored by measuring the viscosity at 25° C. using a Brookfield DV-II+LV viscometer.

Example 2

Lignin solution was prepared by adding 430 g of powder lignin (solid content 91%) and 625 g of water were added to a 5 L glass reactor at ambient temperature and were stirred until the lignin was fully and evenly dispersed. Then, 144 g of 50% alkali solution was added to the lignin dispersion. The composition was stirred for 120 minutes to make sure that the lignin was completely dissolved in the alkaline media.

Example 3

Lignin-phenol-formaldehyde (LPF) resin was synthesized for plywood application with a phenol replacement level of 50% with lignin.

In the first step, 918 g of powder lignin (solid content 91%) and 1225 g of water were added to a 5 L glass reactor at ambient temperature and were stirred until the lignin was fully and evenly dispersed. Then, 426 g of 50% alkali solution was added to the lignin dispersion. The composition was heated to 73° C. and stirred for 60 minutes to make sure that lignin was completely dissolved in the alkaline media. Then, the temperature of the lignin composition was lowered to 45° C.

In the second step, 846 g of phenol and 1802 g of formalin solution (40%) were added into the reaction mixture. The temperature of the reaction mixture was increased to 80° C. and the reaction mixture was continuously stirred for 115 minutes. Then, 315 g of sodium hydroxide solution (50%) was added and the reaction temperature was cooled to 75° C. Then, the reaction mixture was continuously stirred at 75° C. for further 95 minutes before cooling down to room temperature. The reaction was monitored by measuring the viscosity at 25° C. using a Brookfield DV-II+LV viscometer.

Example 4

Birch veneers were sawn to 300×300 mm² size and conditioned in 20° C., 65% RH prior to manufacture. Adhesive formulation was formulated according to Table 1.

TABLE 1

Composition of adhesive formulation for plywood boards

| Component | Amount [wt. %] |
| --- | --- |
| Resin from examples 1 | 50.05 |
| Lignin solution from example 2 | 21.25 |
| Filler/Hardener (contains limestone, cellulose, sodium carbonate, starch) | 14.2 |
| Water | 14.3 |

Target adhesive content was 165 g/m² which were spread on one side. Pre-pressing was performed at a pressure of 1.8 MPa for 15 minutes. The close assembly time was 30 minutes. Hot pressing was performed at 127° C. with a pressure of 1.8 MPa. The total pressing time was 6 minutes 25 seconds. Prior to evaluation, all samples were conditioned according to EN636 class 3 test method. Shear strength was evaluated according to EN314 test method. Average data from 20 test specimens is presented in Table 2.

TABLE 2

Plywood shear strength

| | Shear strength [N/mm²] |
| --- | --- |
| Resin from Example 3 | 1.9 |

Example 5

Birch veneers were sawn to 300×300 mm² size and conditioned in 20° C., 65% RH prior to manufacture. Adhesive formulation was formulated according to Table 3.

TABLE 3

Composition of adhesive for plywood boards

| Component | Amount [wt. %] |
| --- | --- |
| Resin from examples 3 | 60.8 |
| Lignin solution from example 2 | 10.7 |
| Filler/Hardener (contains limestone, cellulose, sodium carbonate, starch) | 14.2 |
| Water | 14.3 |

Target adhesive content was 165 g/m² which were spread on one side. Pre-pressing was performed at a pressure of 1.8 MPa for 15 minutes. The close assembly time was 30 minutes. Hot pressing was performed at 127° C. with a pressure of 1.8 MPa. The total pressing time was 6 minutes 25 seconds. Prior to evaluation, all samples were conditioned according to EN636 class 3 test method. Shear strength was evaluated according to EN314 test method. Average data from 20 test specimens is presented in Table 4.

TABLE 4

Plywood shear strength

| | Shear strength [N/mm²] |
| --- | --- |
| Resin from Example 3 | 1.74 |

In view of the above detailed description of the present invention, other modifications and variations will become apparent to those skilled in the art.

However, it should be apparent that such other modifications and variations may be effected without departing from the spirit and scope of the invention.

Example 6

Reference phenol formaldehyde (PF) resin for laminates was prepared in a 1 L glass reactor and mixed with pitched blade stirrer. Firstly, 375 g of molten phenol, 262.5 g of water and 27 g of NaOH solution (50%) were added to the glass reactor and mixed. Secondly, 367 g of 52.5% formaldehyde solution was added slowly to prevent excessive heat development. The temperature was kept constant at 80° C. for 45 minutes and was then cooled to ambient temperature.

Example 7

Lignin solution was prepared by adding 333 g of powder lignin (solid content 89.9%) and 658 g of water were added to a 1 L glass reactor at ambient temperature and were stirred until the lignin was fully and evenly dispersed. Then, 75 g of 50% alkali solution was added to the lignin dispersion. The composition was stirred for 60 minutes to make sure that the lignin was completely dissolved in the alkaline media Example 8

Impregnation resin formulations consisting of the resin from example 6 and the lignin solution from example 7 were formulated according to table 5. The two components were mixed for 30 minutes with an overhead stirrer.

TABLE 5

| Component | Formulation 1 | Formulation 2 |
|---|---|---|
| Resin from example 6 [wt %] | 74.6 | 84.5 |
| Lignin solution from example 7 [wt %] | 25.4 | 15.5 |

Using the resin reference PF resin from example 6, the impregnation resin formulation 1 from example 8 and the impregnation resin formulation 2 from example 8, kraft paper with a density of 60 g/m2 was impregnated in two steps with drying at 130° C. (42 s in the first step and 120 s in the second step).

The impregnated papers were the cut in circular form (40 mm 0) and were then pressed into 6 layer discs at 130° C., 80 kg/cm². The discs were produced using different pressing times, and were then tested in 24 h bleeding test to determine the pressing needed to fully cure the resin (Table 6).

TABLE 6

| Resin | Press time needed to cure at 130° C. |
|---|---|
| Ref PF resin from example 6 | 5-7 min |
| Resin formulation 1 from example 8 | 4-5 min |
| Resin formulation 2 from example 8 | 4 min |

Example 9

Reference phenol formaldehyde (PF) resin for OSB was prepared in a 5 L glass reactor and mixed with pitched blade stirrer. First, 1320 g of molten phenol, 600 g of water and 294 g of NaOH solution (50%) were added to the glass reactor and mixed. Then 1740 g of 52.5% formaldehyde solution was added stepwise to prevent excessive heat development. The temperature was kept constant at 80° C. for 150 minutes and was then decreased to 60° C. At 60° C., 720 g of urea was added. The solution was then cooled to ambient temperature Example 10

Lignin solution was prepared by adding 347.9 g of powder lignin (solid content 90.47%), 168.7 g of urea and 489.5 g of water were added to a 1 L glass reactor at ambient temperature and were stirred until the lignin and urea mixture was fully and evenly dispersed. Then, 78.65 g of 50% alkali solution was added to the lignin dispersion. The composition was stirred for 200 minutes to make sure that the lignin was completely dissolved in the alkaline media Example 11

A resin formulation for OSB consisting of the resin from example 9 and the lignin solution from example 10 was formulated according to table 7. The two components were mixed for 30 minutes with an overhead stirrer.

TABLE 7

| Component | Formulation |
|---|---|
| Resin from example 9 [wt %] | 50 |
| Lignin solution from example 10 [wt %] | 50 |

Example 12

Pine wood strands for use as surface layer strands were resinated with the resin formulation from example 11 (8% solid resin on oven dry wood mass) and 1% wax, producing strands with a moisture content of 11% after resination).

For the core layer, pine strands were resinated with 4% pMDI (Suprasec 1561, percentage on oven dry wood mass) and 1% wax producing strands with a moisture content of 4%.

The layer ratio was 2×30%/40% between the surface/core layers. The board was pressed at 190° C. for 13 s/mm with a target thickness of 11.5 mm. The thickness swell and water uptake was measured according to ASTM 1037 point 23 Method B after 24 h immersion in cold water. The internal bond strength was measured according to ASTM1037 point 11, the modulus of rupture and modulus of elasticity were measured according to ASTM 3043 point 8, all after acclimatization at 20° C., 65% r.h for 1 week.

TABLE 8

| Board properties | | | | | | | |
|---|---|---|---|---|---|---|---|
| Board sample | Thickness [mm] | Density [kg/m³] | Thickness swell [%] | Water uptake [%] | Internal bond [N/mm²] | MOR [N/mm²] | MOE [N/mm²] |
| Resin formulation from example 11 | 11.69 | 614.6 | 26.3 | 45.7 | 0.20 | 24 | 4187 |

Example 13

A lignin tannin solution was prepared by adding 33 g of lignin, 5 g of tannin and 12 g of 50% sodium hydroxide solution to 50 g of water. The composition was stirred using an overhead stirrer at room temperature until lignin and tannin was completely dissolved.

An adhesive formulation was prepared by mixing 40 g of lignin tannin alkali solution and 60 g of phenol formaldehyde resin for plywood application in a beaker for 5 minutes using an overhead stirrer at room temperature.

The adhesive formulation was tested in a lap-joint test using an Automated Bonding Evaluation System (ABES) tensile tester.

For this purpose, relatively thin beech veneers of thickness of 0.6 mm were used that were cut into 105×20 mm pieces. Resin was applied to an area of 5 mm×20 mm on one side of one end section of the two pieces. Resin coated, overlapped end section of a series of specimens were pressed together in a hot press at a pressure of 5 kg/m$^2$ using pressing time of 90 seconds at pressing temperature of 150° C.

Prior to evaluation, all samples were soaked in water for 24 hours at room temperature. Average data from 5 test specimens with and without conditioning is presented in Table 9.

TABLE 9

| Dry and wet shear strength | | |
|---|---|---|
| | Shear strength [N/mm$^2$] Dry Strength | Shear strength [N/mm$^2$] Wet Strength |
| Adhesive formulation | 4.72 | 3.1 |

The invention claimed is:

1. An adhesive formulation comprising:
   lignin generated in the Kraft process, provided in a form of a solution, wherein the solution comprises alkali in an amount of 3 to 15% by weight and lignin in an amount between 33 to 45% by weight;
   methanol, in an amount between 5 to 30% by weight; and,
   resole phenol-formaldehyde resin,
   wherein the adhesive formulation comprises at least two resins, a first resin comprising the resole phenol-formaldehyde resin and a second resin comprising a lignin-phenol-formaldehyde resin.

2. The adhesive formulation according to claim 1, wherein at least 50% by weight of an amount of total resin in the adhesive formulation comprises a lignin-phenol-formaldehyde resin.

3. The adhesive formulation according to claim 1, wherein the solution comprises an aqueous medium.

4. The adhesive formulation according to claim 1, further comprising:
   urea.

5. The adhesive formulation according to claim 1, further comprising:
   at least one additive selected from a group consisting of: a hardener, a filler, and an extender.

6. A method comprising:
   manufacturing a laminate, a mineral wool insulation, or a wood product with the adhesive formulation according to claim 1.

7. The method of claim 6, wherein the wood product is selected from a group consisting of: plywood, laminated veneer lumber (LVL), medium density fiberboards (MDF), and particle board.

8. A laminate, mineral wool insulation, or wood product comprising: the adhesive formulation according to claim 1.

9. The laminate, mineral wool insulation, or wood product of claim 8, wherein the wood product is selected from a group consisting of: plywood, laminated veneer lumber (LVL), medium density fiberboards (MDF), and particle board.

10. A method for preparing an adhesive formulation comprising the steps of:
    a) providing at least one resole resin comprising phenol and formaldehyde, wherein the at least one resin further comprises lignin;
    b) providing lignin generated in the Kraft process in a form of a solution, wherein the solution comprises alkali in an amount of 3 to 15% by weight and lignin in an amount between 33 to 45% by weight;
    c) mixing the at least one resin, the solution of lignin, and methanol; and,
    d) adding additives to the mixture formed in step c),
    wherein the at least one resin of step a) further comprises lignin.

11. The method of claim 10, further comprising the step of:
    d) adding additives to the mixture formed in step c).

12. The method of claim 10, wherein the additives are present in an amount between 5 to 30% by weight.

\* \* \* \* \*